United States Patent
Holmberg

(10) Patent No.: US 11,994,900 B2
(45) Date of Patent: May 28, 2024

(54) SYSTEM MANAGEMENT MODE EMULATION OF THE REAL-TIME CLOCK

(71) Applicant: Dell Products L.P., Round Rock, TX (US)

(72) Inventor: Richard L. Holmberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 17/387,745

(22) Filed: Jul. 28, 2021

(65) Prior Publication Data
US 2023/0050452 A1    Feb. 16, 2023

(51) Int. Cl.
*G06F 1/14*      (2006.01)
*G06F 21/72*     (2013.01)

(52) U.S. Cl.
CPC .............. *G06F 1/14* (2013.01); *G06F 21/725* (2013.01)

(58) Field of Classification Search
CPC .................................. G06F 1/14; G06F 21/725
See application file for complete search history.

(56) References Cited

U.S. PATENT DOCUMENTS

| | | | |
|---|---|---|---|
| 5,513,319 A | 4/1996 | Finch et al. | |
| 10,175,717 B2 | 1/2019 | Lambert et al. | |
| 10,521,265 B2* | 12/2019 | Wang | G06F 9/4812 |
| 2003/0037237 A1* | 2/2003 | Abgrall | H04L 63/062 |
| | | | 713/166 |
| 2003/0158988 A1* | 8/2003 | Lewis | G06F 9/4812 |
| | | | 710/260 |
| 2007/0038874 A1* | 2/2007 | Lin | G06F 1/3203 |
| | | | 713/300 |
| 2018/0284837 A1 | 10/2018 | Lambert et al. | |
| 2019/0339988 A1 | 11/2019 | Liu et al. | |
| 2021/0018970 A1 | 1/2021 | Ho et al. | |

* cited by examiner

*Primary Examiner* — Brian T Misiura
(74) *Attorney, Agent, or Firm* — Larson Newman, LLP

(57) ABSTRACT

An information handling system sets up at power-on self-test, a system management interrupt based on a trap on an input/output port used for a real-time clock and detects at runtime, an operation on the input/output port. In response to detecting the operation on the input/output port, generates the system management interrupt based on the trap on the input/output port. In addition, the information handling system handles the system management interrupt by emulating the real-time clock according to the operation on the input/output port that includes determining a register that is mapped to an index associated with the operation and accessing the register and executing a function associated with the register.

20 Claims, 3 Drawing Sheets

SYSTEM MANAGEMENT MODE EMULATION OF THE REAL-TIME CLOCK

FIELD OF THE DISCLOSURE

The present disclosure generally relates to information handling systems, and more particularly relates to system management mode emulation of the real-time clock.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system sets up at power-on self-test, a system management interrupt based on a trap on an input/output port used for a real-time clock and detects at runtime, an operation on the input/output port. In response to detecting the operation on the input/output port, generates the system management interrupt based on the trap on the input/output port. In addition, the information handling system handles the system management interrupt by emulating the real-time clock according to the operation on the input/output port that includes determining a register that is mapped to an index associated with the operation and accessing the register and executing a function associated with the register.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
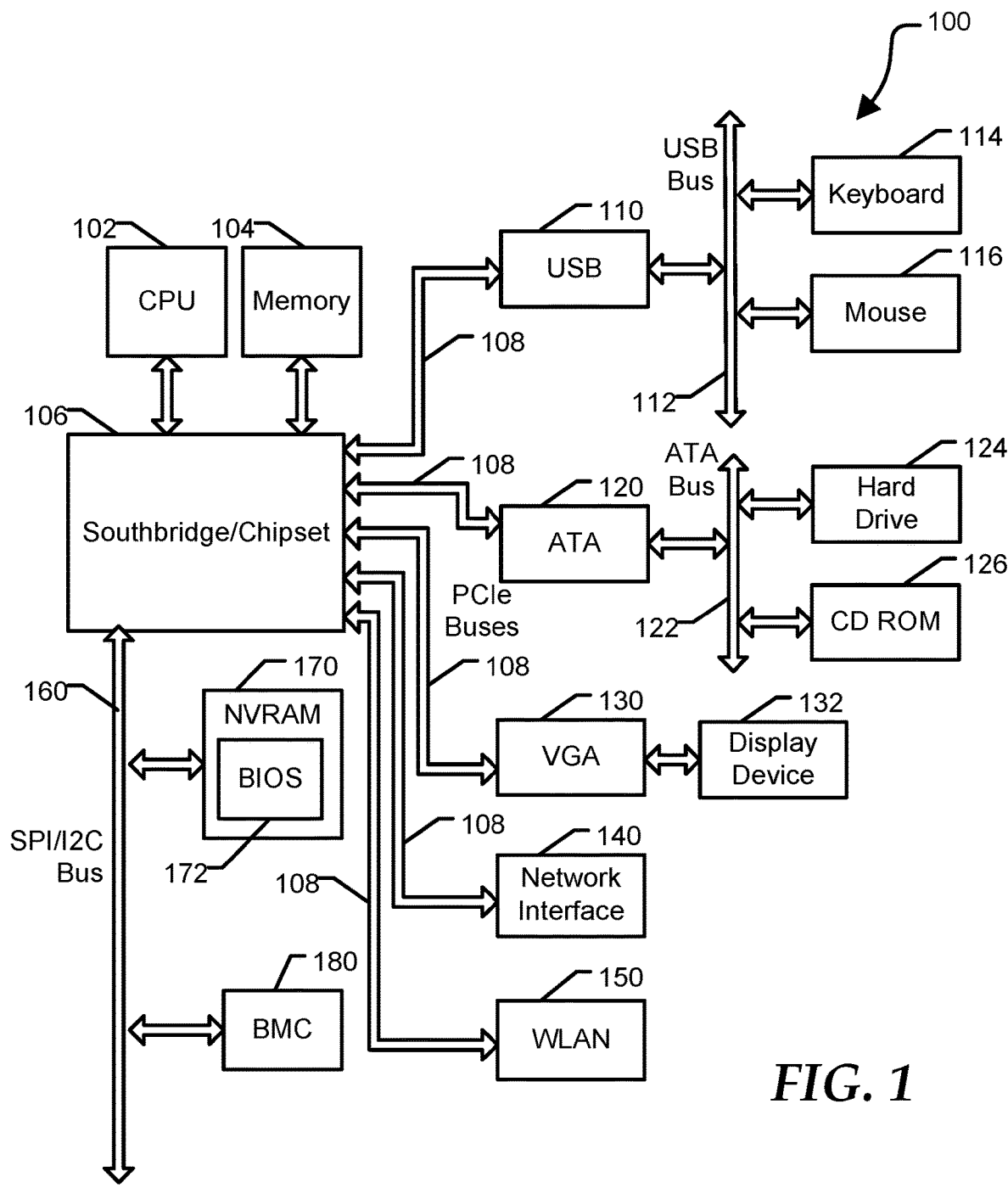
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system (OS) execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The real-time clock has been a part of information handling systems such as the personal computer-advanced technology (PC-AT) standard architecture. The real-time clock is a battery-backed device that maintains the system date and time even when the information handling system is powered off. Currently, the real-time clock is found in the southbridge component. However, if a change in the industry standard to simplify information handling systems is implemented, one or more components, such as the southbridge component, may be eliminated in the next iteration of information handling system design. For example, one or more peripherals in the southbridge component may be consolidated into other components while other peripherals such as the real-time clock may be left out for a computer system designer to implement. Such change in the real-time clock may cause compatibility problems with older OSs, drivers, software applications, etc. To address the above and other concerns, the present disclosure describes a system and method to emulate the functions and interface of the real-time clock. As such older OSs, drivers, software applications, users, etc. may not encounter compatibility problems and be able to proceed like the real-time clock is still implemented.

Figure 2:
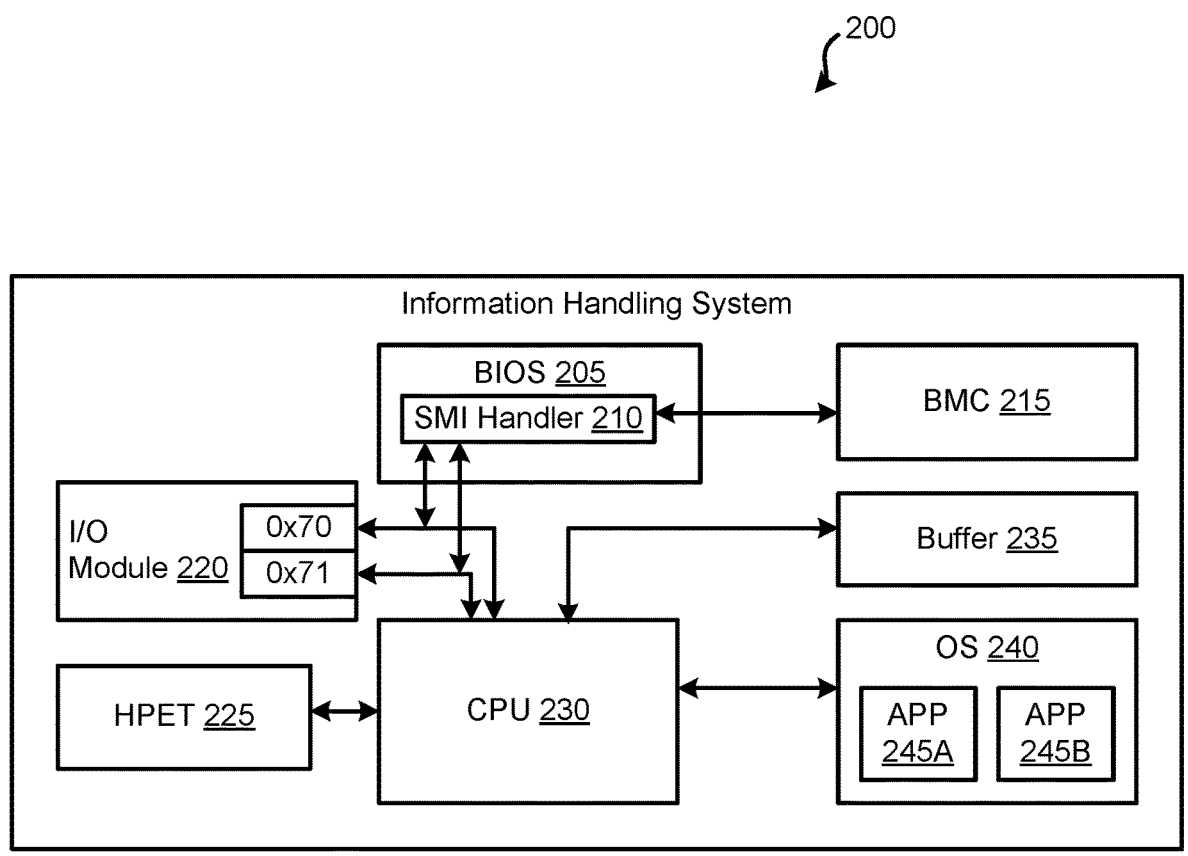
FIG. 2 is a block diagram illustrating an example of a system for system management mode emulation of the real-time clock, according to an embodiment of the present disclosure.

FIG. 2 shows an information handling system 200 which is similar to information handling system 100 of FIG. 1 and configured for system management mode (SMM) emulation of the real-time clock. Information handling system 200 includes a BIOS 205, a BMC 215, an I/O module 220, a high precision event timer (HPET) 225, a CPU 230, a buffer 235, and an OS 240. BIOS 205 includes a system management interrupt (SMI) handler 210. OS 240 includes one or more applications such as an application (APP) 245A and an APP 245B. The components of information handling system 200 shown may be implemented in hardware, software, firmware, or any combination thereof. In addition, the components shown are not drawn to scale and information handling system 200 may include additional or fewer components. In addition, connections between components may be omitted for descriptive clarity.

During the power-on self-test of information handling system 200 and normal operations, OS 240 may utilize the functionality of the real-time clock to establish a time base for various operations, to maintain a secure operating environment, and for other purposes. In addition, BIOS 205 or unified extensible firmware interface (UEFI) accesses the real-time clock to read a time value from or write a time value to the real-time clock. However, because some information handling system designs may not include the real-time clock, issues may arise when OS 240, BIOS 205, or the UEFI utilize or accesses the real-time clock which may be addressed by emulating the real-time clock as disclosed herein.

The real-time clock is a peripheral device that interfaces with the components of an information handling system using the I/O ports 0x70 and 0x71. Typically, there are two banks of real-time clock register sets located in a chipset, a standard bank, and an extended bank. The registers are aliased based on which real-time clock register bank is being accessed. Access to the register set may be provided through a standard index/data register pair.

Typically, a system BIOS or UEFI accesses the standard real-time clock by reading or writing to index/data register pair of I/O ports 0x70 and 0x71. I/O port 0x70 may be used to specify an index or a register to be accessed and to disable a non-maskable interrupt (NMI). Once the register is specified, either the value of that register is read or a new value for that register is written to the real-time clock using I/O port 0x71. The present disclosure emulates the accessing the register set in the standard bank of the real-time clock, referred to herein as a standard real-time clock.

A non-standard real-time clock is disclosed herein to emulate the functions of a standard real-time clock if the standard real-time clock is not implemented in an information handling system. The registers of the non-standard real-time clock can be accessed via the main CPU's address space or via the BMC's address space, and the address of the non-standard real-time clock may vary according to the design of that particular component. In addition, a set of registers may be used to access and program the functions of the non-standard real-time clock. Emulating the functions of the standard real-time clock may be implemented in a couple of embodiments as outlined below.

In one embodiment, BIOS 205 may set up or enable an SMI based I/O trap on I/O ports 0x70 and 0x71 during power-on self-test (POST), wherein an SMI signal is generated and SWIM is activated when a read or write operation is performed on I/O ports 0x70 and 0x71. By using the chipset I/O trap feature, BIOS 205 can trap and control the read or write operation on I/O ports 0x70 and 0x71 to emulate the standard real-time clock.

At runtime, BIOS 205 or in particular SMI handler 210 may handle the trapped reads and writes to I/O ports 0x70 and 0x71 by emulating the function of the standard real-time clock. For example, BIOS 205 may emulate the function of the standard real-time clock each time a component such as OS 240, APP 245A, or APP 245B requests a read from or initiates a write to the standard real-time clock. Each read or each write operation to the I/O ports 0x70 or 0x71 may trigger the SMI. The non-standard real-time clock may then have the read or write operation instead of the standard real-time clock. For example, if OS 240 requests for the current data and/or time, then an SMI is triggered and the non-standard real-time clock provides the current date/time to the requestor.

The non-standard real-time clock may be implemented using BMC 215. When an SMI is triggered by a read or write operation to one of I/O ports 0x70 or 0x71, BIOS 205 may handle the trapped read or write to I/O ports 0x70 or 0x71 operation with CPU 230. Here, CPU 230 may be configured to perform the read from or write to operation on BMC 215 via an IPMI command over an interface such as keyboard controller style (KCS), system management interface chip (SMIC), a shared memory architecture (SMA), block transfer (BT) or similar. CPU 230 may then return a response such as the date and/or time requested to BIOS 205 which then provides it to the component that performed the initial operation. Accordingly, the non-standard real-time clock may perform a read or write operation using CPU 230 to perform the read or write operation via BMC 215 which is similar to BMC 190 of FIG. 1.

In another implementation, BIOS 205 may read the date and/or time once during POST and save the date/time in buffer 235 which is accessible during SMM. BIOS 205 may also make note of a reference offset date and/or time read from a timer associated with CPU 230 such as HPET 250. The reference offset date and/or time may be stored at buffer 235. When a component such as APP 245A, APP 245B, or OS 240 requests the date and/or time from the standard real-time clock, BIOS 205 can generate the current date and/or time by reading the current date and/or time from HPET 250 and calculating an elapsed date and/or time since POST based on the reference offset date and/or time.

Table 1 below shows the various registers of a standard real-time clock and strategies used to emulate their behavior. As shown, each index (bit location) may be mapped to an alias or register name and associated strategy or function to emulate their behavior.

TABLE 1

| Index | Register Name | Strategy for handling writes | Strategy for handling reads |
|---|---|---|---|
| 0x00 | Seconds | The OS is attempting to change the current date/time or set an alarm. The change may be forwarded to the non-standard real-time clock hardware. For example, in a server changes may be sent to a BMC. | The OS is attempting to read the current date/time. The current date/time can either be read from the non-standard real-time clock or may be calculated from a chipset timer such as an HPET. This strategy may be used to improve SMI latency. |
| 0x01 | Second Alarm | | |
| 0x02 | Minutes | | |
| 0x03 | Minutes Alarm | | |
| 0x04 | Hours | | |
| 0x05 | Hour Alarm | | |
| 0x06 | Day of Week | | |
| 0x07 | Day of Month | | |
| 0x08 | Month | | |
| 0x09 | Year | | |
| 0x0A | Status A | Do nothing, bit seven, the update in progress (UIP) bit is read-only, and the other bits are not normally modified by OS-level software. | Return 0x00 (UIP bit is 0). Alternatively, return the UIP bit set if the register is read during a 250 μs window once per second. |

TABLE 1-continued

| Index | Register Name | Strategy for handling writes | Strategy for handling reads |
|---|---|---|---|
| 0x0B | Status B | No need to support run/halt or interrupt generation. Changing binary/binary coded decimal (BCD), 12/24, and daylight savings bits may affect the format returned by future reads of date/time. | Return the value last written to his register. |
| 0x0C | Status C | Do nothing, register is read-only. | Implement alarm interrupt status bit, other bits are zero. A status bit that is set may be cleared when read. |
| 0x0D | Status D | Do nothing, register is read-only. | Return 0x80 indicating that the real-time clock has power. |
| 0x0E to 0x7F | complementary metal-oxide semiconductor (CMOS) NVRAM | The OS is writing to one of the register bytes in the CMOS NVRAM, so save the data in a buffer associated with the SMM. May also save the data somewhere that is non-volatile. | The OS reading from one of the buffers associated with the SMM. May also get the data from non-volatile memory. |

In addition, an example of a pseudocode for implementing a function to emulate the standard real-time clock is shown below:

```
/* The EmulateRTC function uses the parameters port, operation, and
data. Port is one data byte that refers to one of I/O port 0x70 or 0x71
Data is one data byte in the range of 0x00 through 0xFF. Data may refer
to information being written to a non-standard real-time clock memory
such as a date or time. Data may also be used as an index of the register to
be accessed. The operation may be a read or write operation. */
EmulateRTC (port, operation, data) {
  if (port == 0x70)
    if (operation == WRITE)
      savedIndex = data & 0x7F // ANDing with 0x7F sets bit seven to zero
      set NMI behavior from bit 7 of data
      If bit 7 is set then program the chipset component so that NMI is masked.
      If bit 7 is clear then program the chipset component so that NMI is
      unmasked and can interrupt the CPU.
      /* chipset component may be the southbridge, platform controller hub
      (PCH), CPU, etc. */
    else // READ
      return savedIndex
  else if (port == 0x71)
    if (operation == WRITE)
      if (savedIndex < 0x0E)
        /*If savedIndex is greater than 0x0E, then the OS is trying to put a byte of
        data into the standard real-time clock's non-volatile memory. */
        /* The OS is attempting to change the current time or date, save the
        component of the time/date to the non-standard real-time clock. The
        process may also handle changes to status registers here. */
      else
        /*The operating system is writing to one of CMOS NVRAM bytes, so
        save the data in an SMM buffer. The process may also save the data in
        non-volatile memory.*/
    else // READ
      if (savedIndex < 0x0E)
        /* The OS is attempting to read the current time and/or date, so the
        process gets the component of the date and/or time from the non-
        standard real-time clock. The process may also handle reads to status
        registers here. */
      else
        /* The OS is reading the data from one of the CMOS NVRAM bytes,
        so get the data from the buffer associated with the SMM also referred
        to as SMM buffer. The process may also get the data from the non-
        volatile memory. */
}
```

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
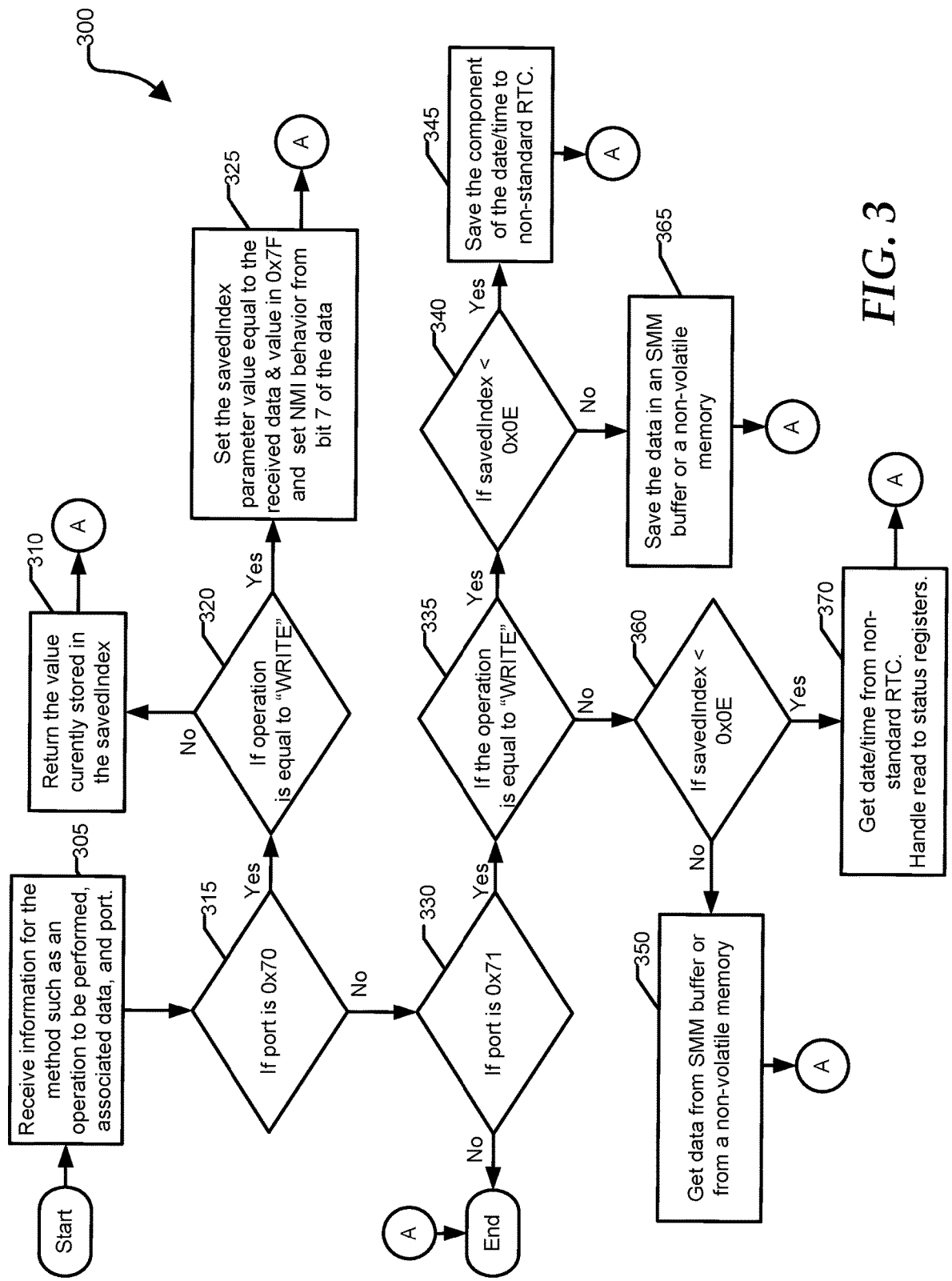
FIG. 3 is a flowchart illustrating an example of a method for system management mode emulation of the real-time clock, according to an embodiment of the present disclosure.

FIG. 3 shows a flowchart of a method 300 for emulating a standard real-time clock. Method 300 may be performed by one or more components of information handling system 200 of FIG. 2. One of skill in the art will appreciate that this flowchart explains a typical example, which can be extended to advanced applications or services in practice.

At block 305, the method receives values associated with the parameters: an operation, data, and port. The value of the parameter port may be one of I/O port 0x70. The operation may be a read or write operation. The value for the parameter data may include one data byte in the range of 0x00 through 0xFF. The method proceeds to decision block 315 where the method determines whether the port is equal to 0x70. If the port is equal to 0x70, then the "YES" branch is taken and the method proceeds to decision block 320. If the port is not equal to 0x70, then the "NO" branch is taken and the method proceeds to decision block 330.

At decision block 320, the method determines whether the operation is equal to a write operation. If the operation is equal to the write operation, then the "YES" branch is taken and the method proceeds to block 325. If the operation is not equal to the write operation, then the "NO" branch is taken and the method proceeds to block 310 where the method returns the value currently stored in the savedIndex. At block 325, the method sets the value of savedIndex parameter equal to the received value of the parameter data appended to 0x7F. The method may also set an NMI behavior from bit seven of the value of the parameter data. If the bit seven is set, then the method may program the chipset hardware so that the NMI is masked and cannot interrupt the CPU. If bit seven is not set, then the method may program the chipset hardware so that NMI is unmasked and can interrupt the CPU. The operation of NMI is outside the scope of this invention. The emulated RTC just provides a mechanism to mask or unmask the hardware interrupt.

At decision block 330, the method determines if the value of the port parameter received at block 305 is equal to 0x71. If the value of the parameter port is equal to 0x71, then the "YES" branch is taken and the method proceeds to decision block 335. If the value of the parameter port is not equal to 0x71, then the "NO" branch is taken and the method ends.

At decision block 335, the method determines whether the value of the operation parameter is equal to write. If the value of the operation parameter is equal to write then the method proceeds to decision block 340. If the value of the operation parameter is not equal to write then the method proceeds to decision block 360. Because the value of the operation parameter can either be write or read, thus if the value of the operation parameter is not write, then the value of the operation parameter is equal to read.

At decision block 340, the method determines whether the value of the savedIndex parameter is equal to 0x0E. If the value of the savedIndex parameter is equal to 0x0E, then the "YES" branch is taken and the method proceeds to block 345. If the value of the savedIndex parameter is not equal to 0x0E, then the "NO" branch is taken and the method proceeds to block 365 where the value in the data parameter is saved in an SMM buffer.

At block 345, the OS is attempting to change the current date and/or time. The method saves the value of the parameter data which may be the date and/or time to be saved to a memory associated with the non-standard real-time clock. The method may also handle changes to status registers. The value of the parameter savedIndex may be used to determine the register name and determine the function taken also referred to as action taken based on the value of the savedIndex. Table 2 shows how to handle writes to the real-time clock registers or status registers.

TABLE 2

| savedIndex | Register Name | Action Taken |
|---|---|---|
| 0x00 | Seconds | The OS is trying to change the seconds portion of the current time. The new value for the seconds register may be forwarded to the non-standard real-time hardware. For example, in a server, the new value for seconds may be sent to the BMC. |
| 0x01 | Second Alarm | The OS is trying to set the seconds portion of the alarm time. The new value for the seconds alarm register may be forwarded to the non-standard real-time clock hardware. For example, in a server, the new value for the seconds alarm register could be sent to the BMC. |
| 0x02 | Minutes | The OS is trying to change the minutes portion of the current time. Action is similar to the seconds register (see above). |
| 0x03 | Minutes Alarm | The OS is trying to set the minutes portion of the alarm time. Action is similar to the seconds alarm register (see above). |
| 0x04 | Hours | The OS is trying to change the hours portion of the current time. Action is similar to the seconds register (see above). |
| 0x05 | Hours Alarm | The OS is trying to set the hours portion of the alarm time. Action is similar to the seconds alarm register (see above). |
| 0x06 | Day of week | The OS is trying to change the day of the week portion of the current date. Action is similar to the seconds register (see above). |

TABLE 2-continued

| savedIndex | Register Name | Action Taken |
| --- | --- | --- |
| 0x07 | Day | The OS is trying to change the day portion of the current date. Action is similar to the seconds register (see above). |
| 0x08 | Month | The OS is trying to change the month portion of the current date. Action is similar to the seconds register (see above). |
| 0x09 | Year | The OS is trying to change the year portion of the current date. Action is similar to the seconds register (see above). |
| 0x0A | Status A | The bits in this register are handled as described below:<br>Bit seven (UIP) - This bit is read-only, so writes can be ignored.<br>Bit zero through three (Rate Selector) - The OS does not normally change these bits, so writes to these bits can be ignored when implementing a practical real-time clock emulation.<br>Bit four through six (Oscillator Control) The OS does not normally change these bits, so writes to these bits can be ignored when implementing a practical real-time clock emulation. |
| 0x0B | Status B | The bits in this register are handled as described below:<br>Bit seven (Run/Halt), Bit six (Periodic Interrupt), Bit five (Alarm Interrupt Enable), Bit four (Update Ended Interrupt), and Bit three (Square Wave Enable) - The OS does not normally change these bits, so writes to these bits can be ignored when implementing a practical real-time clock emulation.<br>Bit two (Data Mode) - If this bit is set to a zero, then subsequent reads and writes to the date/time register values are interpreted as BCD format date. If this bit is set to a 1, then subsequent reads and writes to the date/time register values are interpreted as binary data. The non-standard real-time clock may maintain a "dataMode" flag indicating which mode is currently selected.<br>Bit one (12/24) - If this bit is set to a one, then subsequent reads and writes to the hours register use a twenty-four-hour format with allowable values ranging from zero to twenty-three. If this bit is set to a zero, then subsequent reads and writes to the hours register use a twelve-hour format with allowable values ranging from zero to eleven and bit seven if the hours register may be interpreted as an AM/PM flag (zero = AM, one = PM). The non-standard real-time clock may maintain a "hour12or24" flag indicating which mode is currently selected.<br>Bit zero (Daylight Savings Enable) - The OS is trying to change the automatic daylight savings time policy. The new setting for daylight savings may be forwarded to the non-standard real-time clock hardware. For example, in a server, the new value could be sent to the BMC. In practice, this bit is rarely written by the OS. Daylight savings time adjustments may be done in software without using the real-time clock's help. The non-standard real-time clock may maintain a "daylightSavings" flag indicating which mode is currently selected. |
| 0x0C | Status C | Writes to this register can be ignored because all of the bits are read-only. |
| 0X0D | Status D | Writes to this register can be ignored because all of the bits are read-only. |

At block 350, the method gets the data from the SMM buffer or from a non-volatile memory which may be associated with the non-standard real-time clock. At decision block 360, the method determines if the value of the savedIndex parameter is less than 0x0E. If the value of the savedIndex is less than 0x0E, then the "YES" branch is taken and the method proceeds to block 370. If the value of the savedIndex is not less than 0x0E, then the "NO" branch is taken and the method proceeds to block 350. At block 365, the method saves the value of the data from block 305 to an SMM buffer or a non-volatile memory. At block 370, the method gets the date and/or time from the non-standard real-time clock. In addition, the method handles the reads to status registers. The action taken may be based on the value of savedIndex. Table 3 shows details of handling reads of date and/or time from standard real-time clock registers or status registers mapped to an action taken. The action taken depends on the value of the savedIndex.

TABLE 3

| savedIndex | Register Name | Action Taken |
|---|---|---|
| 0x00 | Seconds | The OS is trying to read the seconds portion of the current time. The current value for seconds may be retrieved from the non-standard real-time clock hardware. For example, in a server, the value for seconds could be read from the BMC. |
| 0x01 | Second Alarm | The OS is trying to read the seconds portion of the alarm time. The current value for the seconds alarm register may be retrieved from the non-standard real-time clock hardware. For example, in a server, the new value for the seconds alarm register could be read from the BMC. |
| 0x02 | Minutes | The OS is trying to read the minutes portion of the current time. Action is similar to the seconds register (see above). |
| 0x03 | Minutes Alarm | The OS is trying to read the minutes portion of the alarm time. Action is similar to the seconds alarm register (see above). |
| 0x04 | Hours | The OS is trying to read the hours portion of the current time. Action is similar to the seconds register (see above). |
| 0x05 | Hours Alarm | The OS is trying to read the hours portion of the alarm time. Action is similar to the seconds alarm register (see above). |
| 0x06 | Day of week | The OS is trying to read the day of the week portion of the current date. Action is similar to the seconds register (see above). |
| 0x07 | Day | The OS is trying to read the day portion of the current date. Action is similar to the seconds register (see above). |
| 0x08 | Month | The OS is trying to read the month portion of the current date. Action is similar to the seconds register (see above). |
| 0x09 | Year | The OS is trying to read the year portion of the current date. Action is similar to the seconds register (see above). |
| 0x0A | Status A | The bits in this register are handled as described below: Bit seven (UIP) - The value of this bit may be returned as 0. In hardware emulation of the standard real-time clock, this bit is set to one for a very short time window (typically two hundred fifty microseconds) once per second while the date and/or time values are changing. This is done to prevent the OS from reading the date and/or time values are they are changing. In a software emulation of the standard real-time clock, this protection does not need to be implemented in the emulation software. The non-standard real-time clock is assumed to include a similar protection mechanism. Bit four through six (Oscillator Control) - The value of these bits may be returned as 010. This is the value that is read from a standard real-time clock when it has been configured to run normally. Bit zero through three (Rate Selector) - The value of these bits may be returned as 0000. This is the value that is read from a standard real-time clock when it has been configured to run normally. |
| 0x0B | | The bits in this register are handled as described below: Bit seven (Run/Halt), Bit six (Periodic Interrupt), Bit five (Alarm Interrupt Enable), Bit four (Update Ended Interrupt), and Bit three (Square Wave Enable) - The value of these bits may be returned as zero. Bit two (Data Mode) - The value of this bit may be returned as the current state of the "dataMode" flag mentioned earlier. Bit one (12/24) - The value of this bit may be returned as the current state of the "hour12-24" flag mentioned earlier. Bit zero (Daylight Savings Enable) - The value of this bit may be returned as the current state of the "daylightSavings" flag mentioned earlier. |

TABLE 3-continued

| savedIndex | Register Name | Action Taken |
|---|---|---|
| 0x0C | Status C | The bits in this register are handled as described below: Bit seven (Interrupt request flag) and Bit 5 (Alarm interrupt flag) - The value of these bits may be returned as one of the current time (hour/minute/second) matches the alarm time, otherwise the value of this bit may be returned as zero. Bit six (Periodic interrupt flag) - The value of this bit may be returned as zero. Bit four (Update ended interrupt flag) - The value of this bit may be returned as zero. Bit zero through three - The value of this bit may be returned as zero. |
| 0x0D | Status D | Reads from this register may return a value of 0x80, indicating that the real-time clock has power and is operating normally. |

Although FIG. 3 shows example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   setting up, by a basic input and output system during power-on self-test, a system management interrupt based on a trap on an input/output port used for a real-time clock;
   detecting, at runtime, an operation on the input/output port;
   in response to the detecting the operation on the input/output port, generating the system management interrupt based on the trap on the input/output port; and
   handling the system management interrupt by emulating the real-time clock according to the operation on the input/output port, wherein the handling of the system management interrupt includes:
   determining a register that is mapped to an index associated with the operation;
   accessing the register and executing a function associated with the register; and
   setting a non-maskable interrupt based on bit seven of data received with the operation on the input/output port.

2. The method of claim 1, wherein the operation on the input/output port is either a read operation or a write operation.

3. The method of claim 1, wherein the handling of the system management interrupt is further based on the data associated with the operation on the input/output port.

4. The method of claim 1, the method further comprising executing the function associated with the register using a baseboard management controller.

5. The method of claim 1, the method further comprising:
   reading, during the power-on self-test, a first date/time from a timer of an information handling system;

storing the first date/time at a system management mode buffer;

storing a reference offset date/time from the timer; and determining a current real-time clock date/time based on the first date/time stored at the system management mode buffer and an elapsed date/time since the power-on self-test based on the reference offset date/time, in response to a request for the current real-time clock date/time.

6. The method of claim 1, the method further comprising setting the bit seven of the data to zero and return value of the index.

7. An information handling system, comprising:

an input/output port for a real-time clock; and a basic input/output system configured to:

set up, during power-on self-test, a system management interrupt based on a trap on the input/output port for the real-time clock;

detect, during a runtime, an operation on the input/output port used for the real-time clock;

generate the system management interrupt based on the trap on the input/output port, in response to the detection of the operation on the input/output port; and handle the system management interrupt by emulating the real-time clock, wherein the basic input/output system further configured to:

determine a register that is mapped to an index associated with the operation;

access the register and executing a function associated with the register;

set bit seven of data to zero and return value of the index; and set a non-maskable interrupt based on bit seven of data received with the operation on the input/output port.

8. The information handling system of claim 7, wherein the operation on the input/output port is either a read operation or a write operation.

9. The information handling system of claim 7, wherein the handling of the system management interrupt is further based on data associated with the operation on the input/output port.

10. The information handling system of claim 7, wherein the basic input/output system is further configured to:

read, during the power-on self-test, a first date/time from a timer of the information handling system;

store the first date/time at a system management mode buffer;

store a reference offset date/time from the timer; and determine a current real-time clock date/time based on the first date/time stored at the system management mode buffer and an elapsed date/time since the power-on self-test based on the reference offset date/time, in response to a request for the current real-time clock date/time.

11. The information handling system of claim 10, wherein the timer is a high precision event timer.

12. The information handling system of claim 7, wherein the handling of the system management interrupt is further based on the data associated with the operation on the input/output port.

13. The information handling system of claim 7, the basic input/output system is further configured to execute the function associated with the register using a baseboard management controller.

14. A non-transitory computer-readable medium including code that when executed causes a processor to perform a method, the method comprising:

setting up, during a power-on self-test, a system management interrupt based on a trap on an input/output port used for a real-time clock;

detecting, during runtime, an operation on the input/output port;

generating the system management interrupt based on the trap on the input/output port, in response to the detecting the operation on the input/output port; and handling the system management interrupt by emulating the real-time clock according to the operation on the input/output port, wherein the handling of the system management interrupt includes:

determining a register that is mapped to an index associated with the operation;

accessing the register and executing a function associated with the register; and setting a non-maskable interrupt based on bit seven of data received with the operation on the input/output port.

15. The non-transitory computer-readable medium of claim 14, wherein the operation on the input/output port is either a read operation or a write operation.

16. The non-transitory computer-readable medium of claim 14, wherein the handling of the system management interrupt is further based on the data associated with the operation on the input/output port.

17. The non-transitory computer-readable medium of claim 14, the method further comprising executing the function associated with the register using a baseboard management controller.

18. The non-transitory computer-readable medium of claim 14, the method further comprising:

reading, during the power-on self-test, a first date/time from a timer of an information handling system;

storing the first date/time at a system management mode buffer;

storing a reference offset date/time from the timer; and determining a current real-time clock date/time based on the first date/time stored at the system management mode buffer and an elapsed date/time since the power-on self-test based on the reference offset date/time, in response to a request for the current real-time clock date/time.

19. The non-transitory computer-readable medium of claim 18, wherein the timer is a high precision event timer.

20. The non-transitory computer-readable medium of claim 14, the method further comprising setting the bit seven of the data to zero and return value of the index.

* * * * *